United States Patent [19]

Yamanaka et al.

[11] Patent Number: 5,768,053
[45] Date of Patent: Jun. 16, 1998

[54] FLYING MAGNETIC HEAD SLIDER

[75] Inventors: Noboru Yamanaka; Masashi Shiraishi, both of Saku, Japan

[73] Assignee: TDK Corporation, Tokyo, Japan

[21] Appl. No.: 686,099

[22] Filed: Jul. 24, 1996

[30] Foreign Application Priority Data

Aug. 4, 1995 [JP] Japan .................. 7-218274

[51] Int. Cl.$^6$ .................................. G11B 5/60
[52] U.S. Cl. .................................. 360/103
[58] Field of Search .................... 360/103–105

[56] References Cited

U.S. PATENT DOCUMENTS

| | | | |
|---|---|---|---|
| 4,673,996 | 6/1987 | White | 360/103 |
| 5,212,608 | 5/1993 | Yoneoka | 360/103 |
| 5,267,109 | 11/1993 | Chapin et al. | 360/103 |
| 5,343,343 | 8/1994 | Chapin | 360/103 |
| 5,345,353 | 9/1994 | Krantz et al. | 360/103 |
| 5,396,387 | 3/1995 | Murray | 360/103 |
| 5,442,850 | 8/1995 | Kerth | 360/103 |
| 5,515,219 | 5/1996 | Ihrke et al. | 360/103 |
| 5,606,476 | 2/1997 | Chang et al. | 360/103 |
| 5,624,581 | 4/1997 | Ihrke et al. | 360/103 |
| 5,636,086 | 6/1997 | Bolasna et al. | 360/103 |
| 5,685,645 | 11/1997 | Nepela et al. | 360/103 |

FOREIGN PATENT DOCUMENTS 5-54580 3/1993 Japan .
6-195916 7/1994 Japan .

OTHER PUBLICATIONS

S. Yoneoka et al. "A Negative Pressure Microhead Slider for Ultralow Spacing ...", IEEE Transactions on Magnetic, vol. 27, No. 6, Nov. 1991, pp. 5085–5087.

*Primary Examiner*—Stuart S. Levy
*Assistant Examiner*—Allen Cao
*Attorney, Agent, or Firm*—Collard & Roe, P.C.

[57] ABSTRACT

A flying magnetic head slider with leading and trailing edges and side edges includes a plurality of rails extending along the side edges from the leading edge to the trailing edge. At least one of the rails includes a first narrow portion with a narrower rail width, located at a position near the leading edge, at least one second narrow portion with a partially narrower rail width, located at a position apart from the leading edge by a distance with a ratio of 0.6 to 0.9 to a whole longitudinal length of the slider, and a widening portion located between the at least one second narrow portion and the trailing edge, partially having a rail width increasing from the narrower rail width of the second narrow portion.

4 Claims, 8 Drawing Sheets

FLYING MAGNETIC HEAD SLIDER

FIELD OF THE INVENTION

The present invention relates to a flying magnetic head slider used in a disk type memory device of a computer system, particularly to a negative-pressure head slider.

DESCRIPTION OF THE RELATED ART

It has been requested, for a flying magnetic head slider, to achieve a very low spacing with uniform flying height in accordance with recent demand for higher recording density of a HDD (Hard Disk Device). Particularly, in case of a swing-arm type HDD which has recently spread, it is necessary to keep a constant flying height by compensating variation of a relative speed of the slider with respect to a surface of the disk and by compensating variation of a skew angle of the slider across the disk surface.

A typical magnetic head slider assembly for keeping a constant flying height is a TPC (Traverse Pressurization Contour) slider described in U.S. Pat. No. 4,673,996. The TPC slider in this patent has an air bearing surface with a notched recess having a very small depth along each side edge of the air bearing surface to produce traverse pressurization. This TPC slider is alleged to provide an almost constant flying height. However, it has been pointed out that the TPC slider will require a very precise machining for forming the TPC because few micron error in its size will cause to vary the flying height. Also, it has been pointed out that a HDD using the TPC slider will behave unstable movement during the seeking operation.

Another flying head sliders are negative-pressure head sliders described in, for example, Japanese Patent Unexamined Publication No. 6(1994)-195916 and in S.Yoneoka et al., "A NEGATIVE PRESSURE MICROHEAD SLIDER FOR ULTRALOW SPACING WITH UNIFORM FLYING HEIGHT", IEEE Transactions on Magnetic, Vol.27, No.6, November 1991, pp.5085–5087, respectively. The former slider provides negative pressure by making up a U-shaped rail near its leading edge, whereas the latter slider provides negative pressure by making up a recess by widening the distance between its two side rails. These negative-pressure sliders are alleged to improve their dynamic flying characteristics by balancing the positive and negative air pressures with the loading force applied from the suspension. However, it is quite difficult for these conventional negative-pressure sliders to realize a constant flying height characteristics across the disk as that obtained by the above-mentioned TPC slider. For example, if the conventional negative-pressure slider is designed to have a flying height of 60 nm, this slider may in fact produce a difference of about 10 nm between the flying heights at the inner and outer positions of the disk. Furthermore, although each of these conventional negative-pressure sliders can attain a desired constant flying height at a specific position of the slider, a large roll of the slider may be occurred and thus uniform flying height over the whole air bearing surface cannot be expected.

One reason why these problems occur in the conventional negative-pressure sliders is that it is difficult for these conventional sliders to conduct a precise pressure compensation near their trailing edge. Namely, according to the former slider, since a region for producing the negative pressure is positioned near the leading edge, it is impossible to precisely compensate the pressure force near the trailing edge. Also, according to the latter slider, since a region for producing the negative pressure is positioned near the center of the slider as shown in FIG. 8 of this reference, it is impossible to compensate the pressure force near the trailing edge. The TPC slider is also impossible to compensate enough the pressure near the trailing edge.

A slider described in U.S. Pat. No. 5,267,109 has a region for producing the negative pressure near the trailing edge. Since this slider obtains the negative pressure by forming recessed reliefs in the two rails at positions adjacent their trailing edges, no magnetic head transducer can be made on the trailing end faces of these rails. Thus, the slider in this patent has to have a third rail for forming a magnetic head transducer near the trailing edge of the slider at the center of the two rails. However, according to this slider, the third rail will produce a large positive pressure force balanced with the negative pressure force produced by the recessed reliefs, at its trailing edge, resulting that it is quite difficult to increase rigidity of passing air stream so as to obtain stable flying characteristics except that the HDD is operating at a specific condition.

SUMMARY OF THE INVENTION

It is therefore an object of the present invention to provide a flying magnetic head slider which can maintain a stable constant flying height.

Another object of the present invention is to provide a flying magnetic head slider which can be designed with a very large degree of freedom.

Still another object of the present invention is to provide a flying magnetic head slider with a large tolerance for manufacturing.

According to the present invention, a flying magnetic head slider with leading and trailing edges and side edges is provided. The slider includes a plurality of rails extending along the side edges from the leading edge to the trailing edge. At least one of the rails includes a first narrow portion with a narrower rail width, located at a position near the leading edge, at least one second narrow portion with a partially narrower rail width, located at a position apart from the leading edge by a distance with a ratio of 0.6 to 0.9 to a whole longitudinal length of the slider, and a widening portion located between the at least one second narrow portion and the trailing edge, partially having a rail width increasing from the narrower rail width of the second narrow portion.

The first narrow portion provides a first negative-pressure production area near the leading edge by relaxing the passing air stream which was once compressed at the leading edge portions, as well as done in the conventional negative-pressure slider. By balancing the negative-pressure force produced at this first negative-pressure production area with the positive-pressure force produced by the rails, stable flying characteristics with a low dependency upon the relative speed with respect to the disk surface and a high rigidity of passing air stream can be obtained.

The second narrow portion provides a second negative-pressure production area at a position apart from the leading edge by a distance with a ratio of 0.6 to 0.9 to a whole longitudinal length of the slider, and thus skew angle in the HDD can be precisely compensated.

According to the present invention, thanks for functions of both the first and second negative-pressure production areas, extremely stable flying characteristics can be obtained. Since these negative-pressure production areas can be provided only by adjusting rail width at positions within a predetermined region without modifying a position of the magnetic transducer element on the slider, the slider can be designed with a very large degree of freedom. Furthermore, the slider according to the present invention has a large tolerance of size in comparison with the conventional TPC slider, and thus manufacturing processes will become extremely easy.

The at least one rail may include only one or a plurality of the second narrow portions. In the latter case, more stable flying characteristics can be obtained.

The second narrow portion may be constituted by depressing an inner side edge and/or an outer side edge of the rail.

The slider may have a plurality of rails, and the plurality of rails may be connected by a cross rail formed near the leading edge on the slider.

Further objects and advantages of the present invention will be apparent from the following description of the preferred embodiments of the invention as illustrated in the accompanying drawings.

DESCRIPTION OF THE PREFERRED EMBODIMENTS

Figure 1:
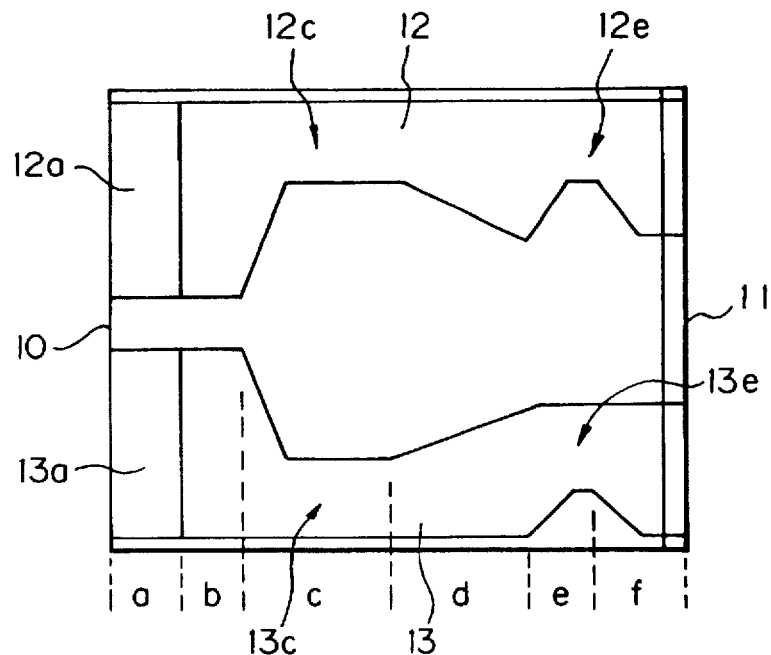
FIG. 1 is a bottom view showing an air bearing surface constitution of a preferred embodiment of a flying magnetic head slider according to the present invention.

FIG. 1 shows an air bearing surface (ABS) configuration of a preferred embodiment of a flying magnetic head slider according to the present invention.

In the figure, reference numeral 10 denotes a leading edge (air-intake side edge) of the flying head slider, 11 denotes a trailing edge (air-outlet side edge) of the slider, and 12 and 13 denote two rails extending along side edges of the slider from the leading edge 10 to the trailing edge 11, respectively. In operation, these rails 12 and 13 will fly above the disk surface so that these rails 12 and 13 face the outward and inward positions of the disk, respectively. As indicated by 12a and 13a in the figure, the leading edge portions of the rails 12 and 13 are chamfered. In other words, the rails in a predetermined length region "a" from the leading edge 10 are formed as the tapered portions 12a and 13a.

The rails 12 and 13 in a region b with a predetermined length are formed in wide as well as that in the region "a". Namely, the rails 12 and 13 have a wide width over the region "a" (region for the chamfers 12a and 13a) and the region "b". In the next region "c", the rails 12 and 13 have first narrow portions 12c and 13c with a narrower rail width. These first narrow portions 12c and 13c provide a first negative-pressure production area near the leading edge 10 by relaxing the passing air stream which was once compressed at the leading edge portions (regions "a" and "b"), as well as done in the conventional negative-pressure slider. By balancing the negative-pressure force produced at this first negative-pressure production area with the positive-pressure force produced by the rails, stable flying characteristics with a low dependency upon the relative speed with respect to the disk surface and a high rigidity of passing air stream can be obtained.

The rail width is gradually increased in the next region "d", and thus the rails 12 and 13 have second narrow portions 12e and 13e with a narrower rail width in the subsequent region "e". In this embodiment, these second narrow portions 12e and 13e are formed at a position apart from the leading edge 10 by a distance of a slider length ratio of about 0.7. The slider length ratio represents, in this specification, a ratio of the distance from the leading edge to a whole longitudinal length of the slider. These second narrow portions 12e and 13e provide a second negative-pressure production area at these positions, and thus skew angle in the HDD can be precisely compensated.

In the next region "f" up to the trailing end 11, the rail width is increased again to form widening portions.

As seen in FIG. 1, the first narrow portions 12c and 13c in this embodiment are formed by depressing the inner side edges of the rails 12 and 13, whereas the second narrow portions 12e and 13e are formed by depressing the inner side edge of the rail 12 and the outer side edge of the rail 13 (side edges of both the rails 12 and 13 toward the disk center in operation).

The depth of the first and second negative-pressure production areas will be adequately determined within a range of 1 to 10 μm so as to obtain an optimum negative pressure value.

Figure 2:
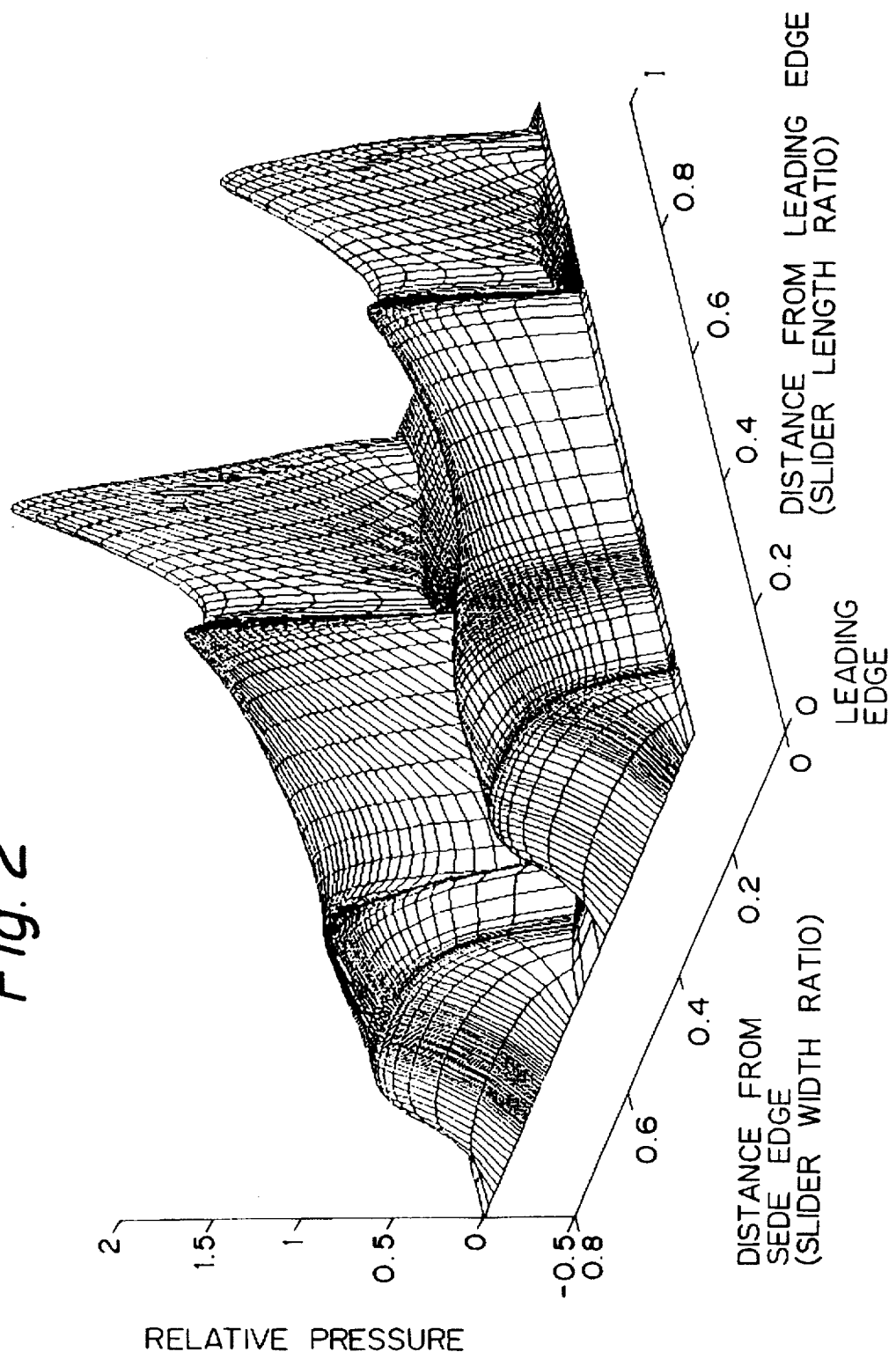
FIG. 2 is a three dimensional view of a pressure distribution of the slider shown in FIG. 1.
Figure 3:
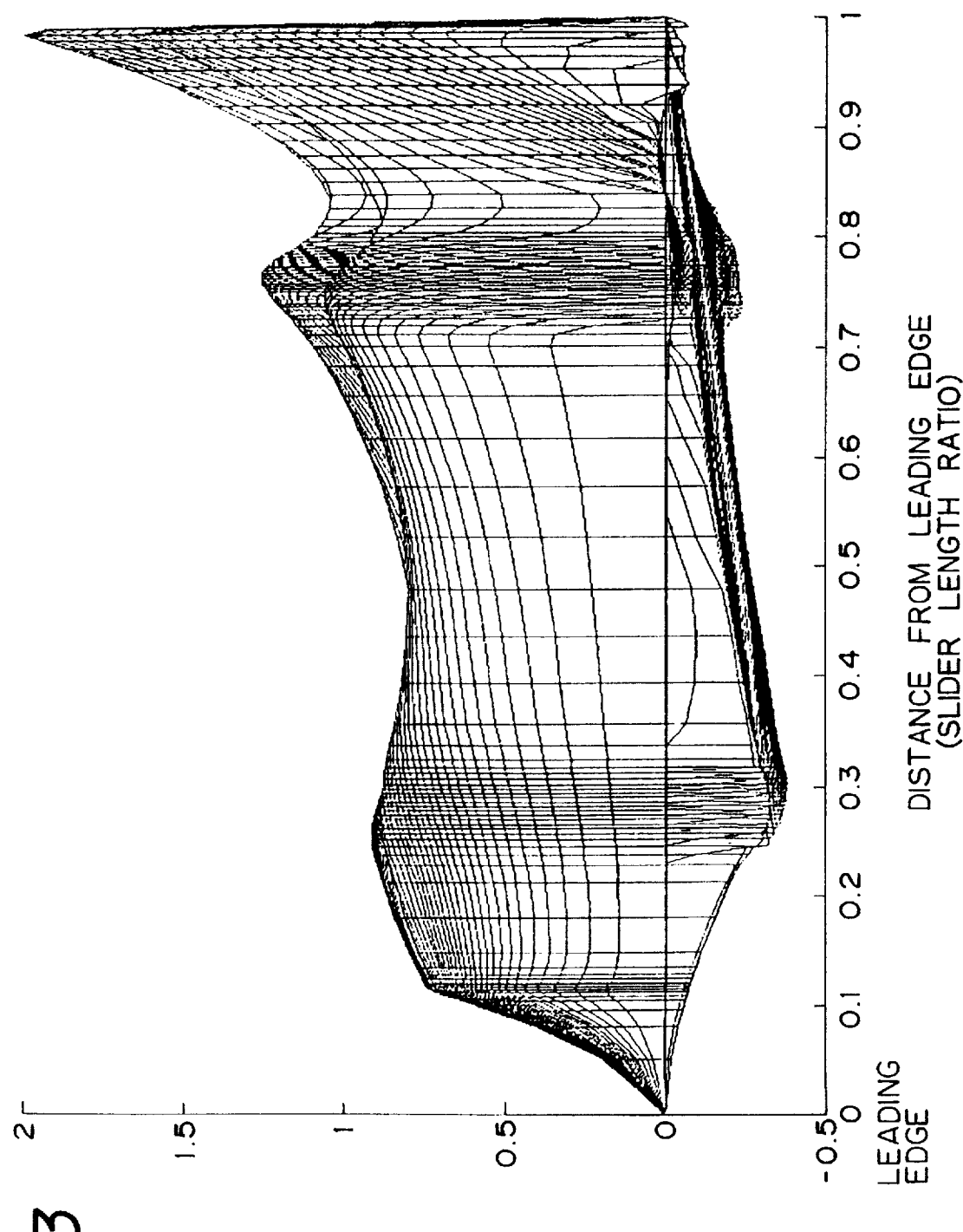
FIG. 3 is a two dimensional view of the pressure distribution of the slider shown in FIG. 1.

FIGS. 2 and 3 illustrate a pressure distribution of the slider shown in FIG. 1. In FIG. 2 which is a three dimensional pressure distribution, the axis of abscissas indicates a distance from the leading edge (slider length ratio), the axis of ordinates indicates a distance from one side edge of the slider (slider width ratio), and the third axis indicates a relative pressure. The slider width ratio represents, in this specification, a ratio of the distance from the one side edge of the slider to a whole lateral width of the slider. In FIG. 3 which is a two dimensional pressure distribution viewed from a lateral side of the slider, the axis of abscissas indicates a distance from the leading edge (slider length ratio), and the axis of ordinates indicates a relative pressure.

As will be apparent from these figures, particularly from FIG. 3, the negative pressure is produced at two separated positions on the leading edge side (at a distance of a slider length ratio of about 0.3) and the trailing edge side (at a distance of a slider length ratio of about 0.7–0.8).

Figure 4:
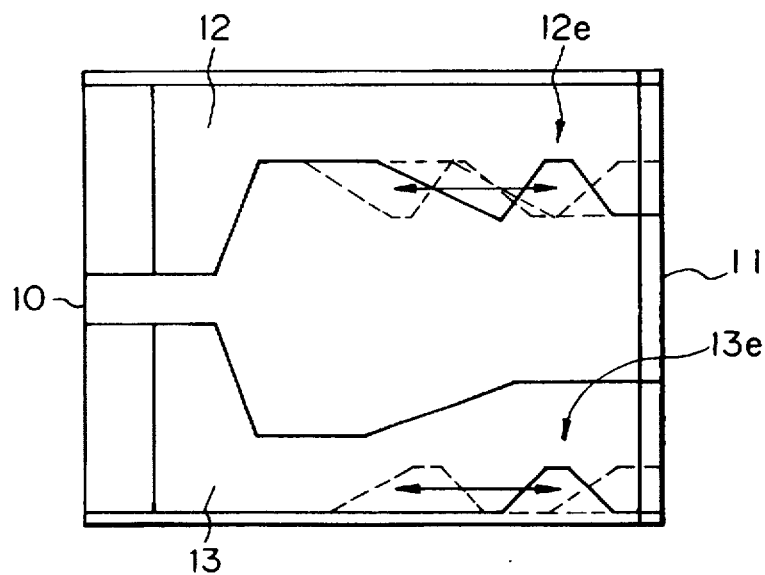
FIG. 4 is a bottom view showing an air bearing surface constitution of a modification of the slider shown in FIG. 1.

In the embodiment shown in FIG. 1, the second narrow portions 12e and 13e are formed at a position with the distance of a slider length ratio of about 0.7. However, these second narrow portions of the flying slider according to the present invention may be formed at positions shifted along the side edges of the slider as shown by broken lines in FIG. 4. The positions of these second narrow portions will be determined within a certain range to obtain desired flying characteristics, as will be described in detail hereinafter.

Figure 5:
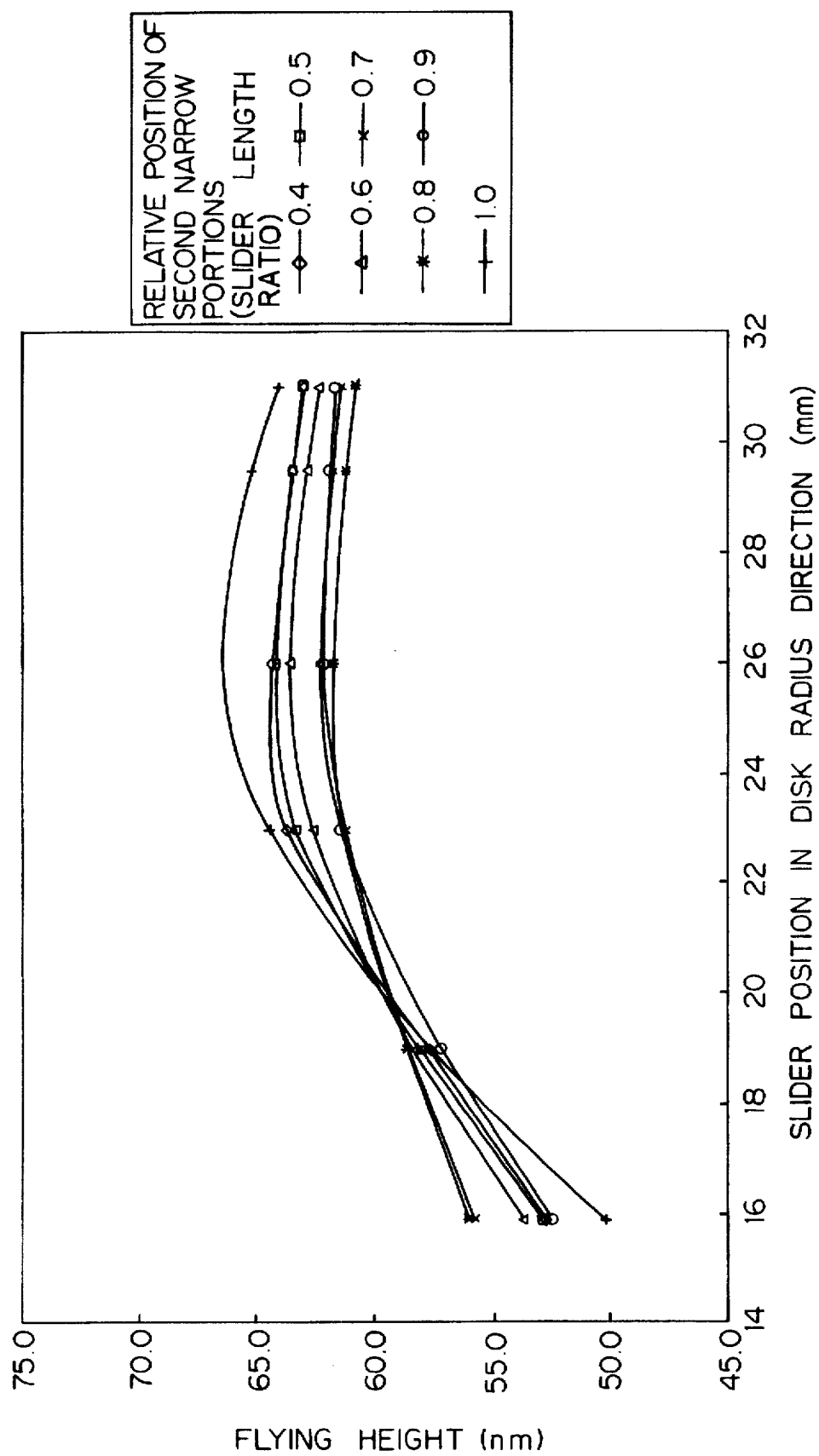
FIG. 5 is a graph showing flying height characteristics of the slider shown in FIG. 1 mounted on a HDD, wherein a relative position of the second narrow portions from the leading edge of the slider are used as a parameter.
Figure 6:
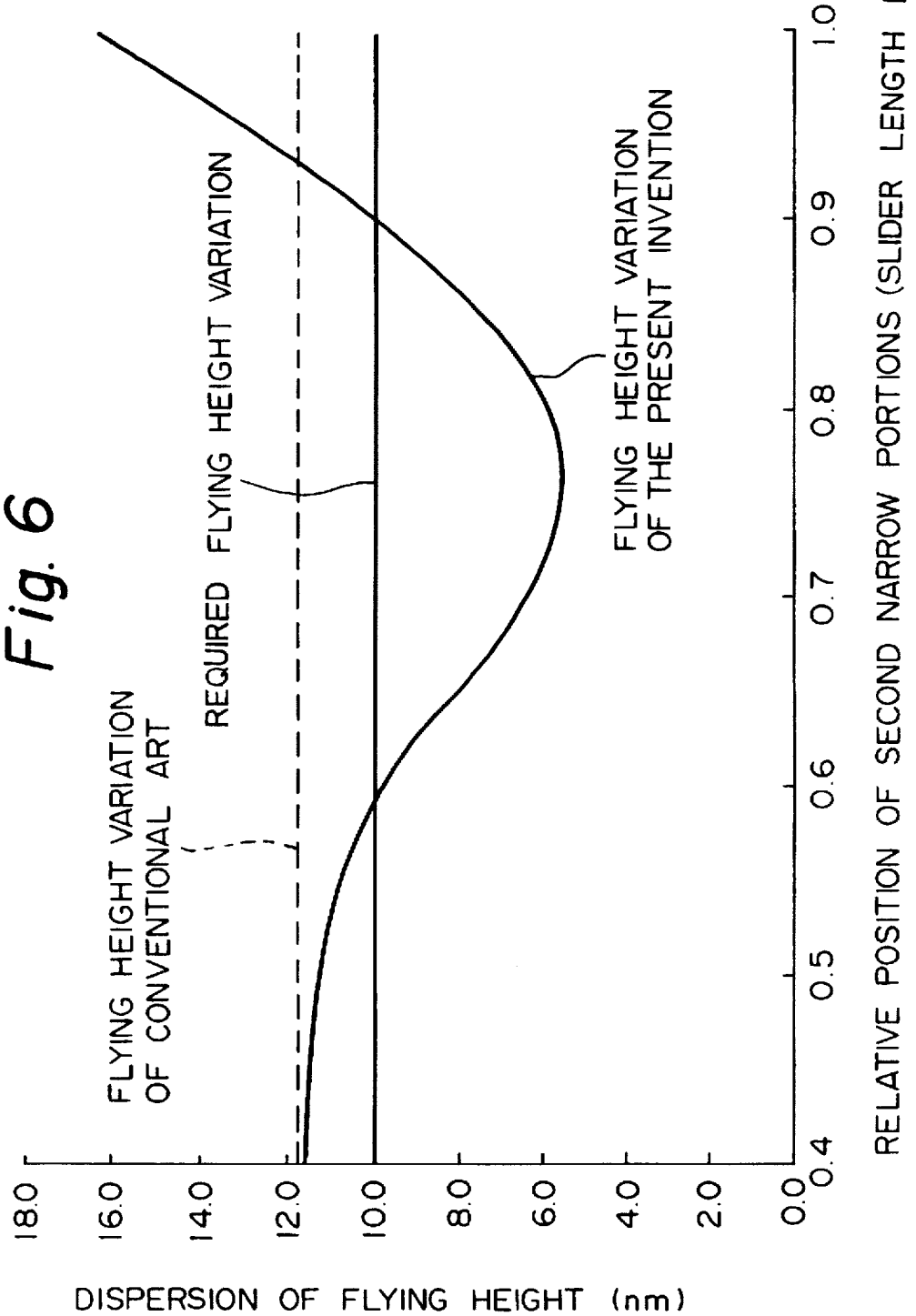
FIG. 6 is a graph showing flying height variations characteristics of the slider shown in FIG. 1 and of the conventional slider.

FIG. 5 shows flying height characteristics of the slider of this embodiment mounted on a HDD, wherein a relative position (slider length ratio) of the second narrow portions from the leading edge of the slider are used as a parameter. In this figure, the axis of abscissas indicates a slider position in the radius direction of the disk (distance from the disk center) and the axis of ordinates indicates a flying height of the slider. FIG. 6 shows flying height variations characteristics of the slider of this embodiment and of the conventional slider. In this figure, the axis of abscissas indicates a relative position of the second narrow portions (slider length ratio) and the axis of ordinates indicates a flying height dispersion of the slider. The HDD used has an allowable flying height dispersion of ± nm for designing rails to obtain a flying height of 60 nm.

As will be apparent from FIG. 6, the second narrow portions provided at an adequate position of the respective rails can result stable flying characteristics with a very lower flying height variations than that in the conventional slider. If the second narrow portions is located at a position apart from the leading edge by a distance shorter than a slider length ratio of 0.6 or a distance longer than a slider length ratio of 0.9, good flying characteristics cannot be expected. Namely, if the distance between the second narrow portions and the leading edge is shorter than a slider length ratio of 0.6, the negative pressure force caused by the second narrow portions will be absorbed in the negative pressure force caused by the first narrow portions. Thus, these second narrow portions will not contribute for controlling the flying height at the trailing edge of the slider. Contrary to this, if the distance between the second narrow portions and the leading edge is longer than a slider length ratio of 0.9, the flying characteristics will be greatly deteriorated. This is because since the second narrow portions close to the trailing edge, enough flying height will not be obtained when the slider locates at the inner position of the rotating disk. As a result, it is necessary that the second narrow portions are formed at a position apart from the leading edge of the slider by a distance of a slider length ratio of 0.6 to 0.9.

Figure 7:
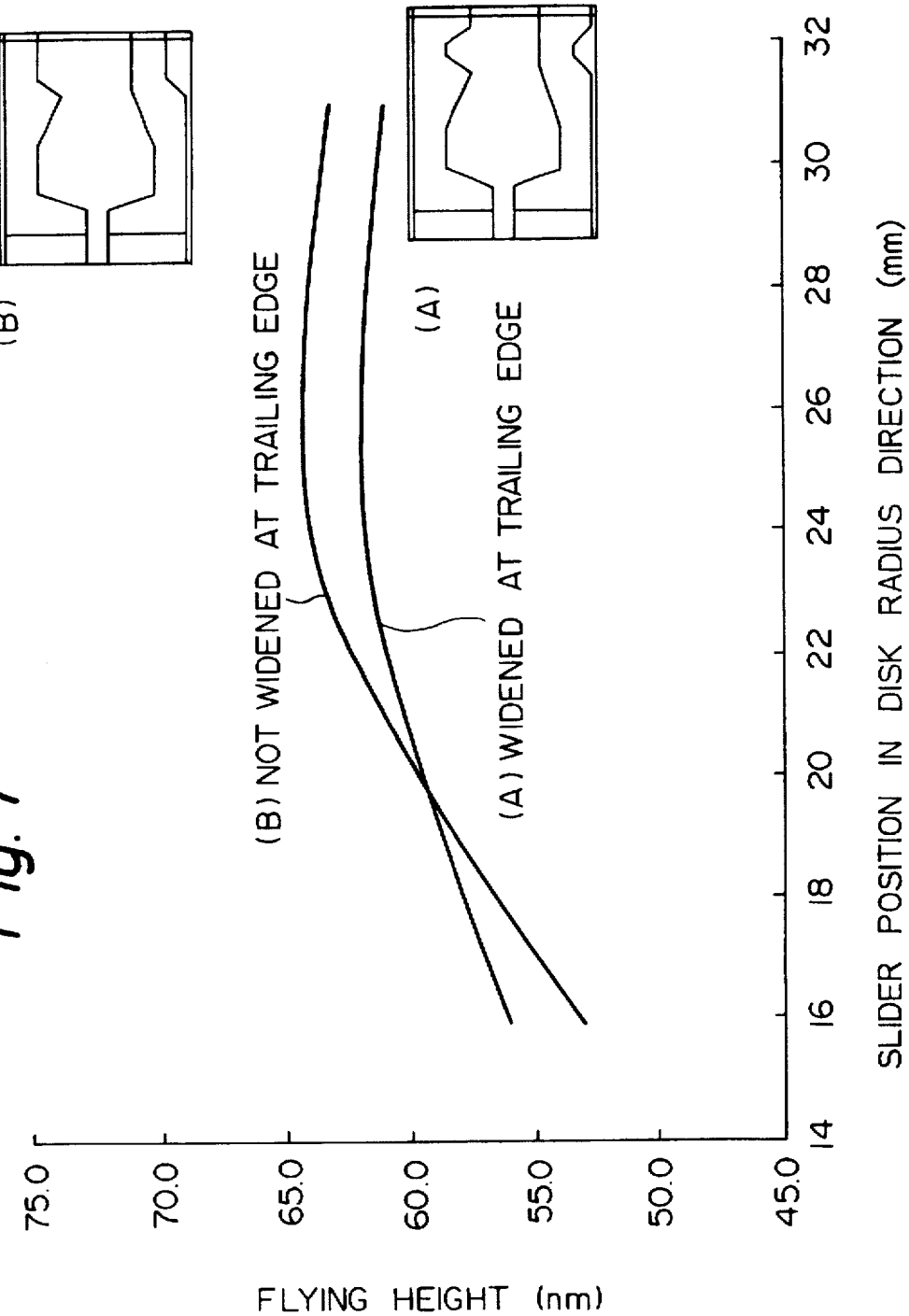
FIG. 7 is a graph showing flying height characteristics of the slider shown in FIG. 1 depending upon rail widths near the trailing edge.

FIG. 7 shows flying height characteristics of the slider of this embodiment depending upon rail widths near the trailing edge (in the region e shown in FIG. 1).

In this figure, the axis of abscissas indicates a slider position in the radius direction of the disk (distance from the disk center) and the axis of ordinates indicates a flying height of the slider. Also, (A) of FIG. 7 represents flying height characteristics of a slider with a rail width widened again near the trailing edge of the slider from the narrower rail width at the second narrow portions, and (B) of FIG. 7 represents flying height characteristics of a slider with a rail width not widened at the trailing edge of the slider from the rail width at the second narrow portions (a slider with the same rail width at the trailing edge as that at the second narrow portions).

As will be apparent from these characteristics, the flying height of the slider with the widening portions having an increased rail width at the trailing edge as that of the present invention relatively slowly varies with respect to the slider position changes in the disk radius direction, but the flying height of the slider with the narrow rail width at the trailing edge abruptly changes, especially when the slider approaches to the disk center causing the slider to have a large dispersion of the flying height. Therefore, it is necessary that at least one of the rails has the widening portion with a rail width partly widened toward its trailing edge from the narrower rail width at the second narrow portions.

Figure 8:
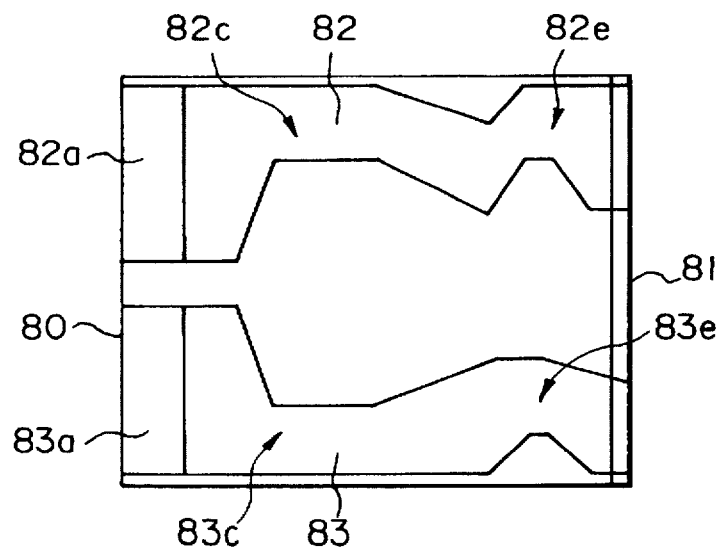
FIG. 8 is a bottom view showing an air bearing surface constitution of an another embodiment of a flying magnetic head slider according to the present invention.

FIG. 8 shows an ABS configuration of an another embodiment of a flying magnetic head slider according to the present invention.

In the figure, reference numeral 80 denotes a leading edge (air-intake side edge) of the flying head slider, 81 denotes a trailing edge (air-outlet side edge) of the slider, and 82 and 83 denote two rails extending along side edges of the slider from the leading edge 80 to the trailing edge 81, respectively. Also, reference numeral 82a and 83a denote tapered portions formed near the leading edge 80 of the rails 82 and 83, 82c and 83c denote first narrow portions of the rails 82 and 83, and 82e and 83e denote second narrow portions of the rails 82 and 83, respectively.

As well as the first narrow portions 12c and 13c in the embodiment of FIG. 1, the first narrow portions 82c and 83c in this embodiment are formed by depressing the inner side edges of the rails 82 and 83. The second narrow portions 82e and 83e are formed by depressing the inner side edge of the rail 82 and the outer side edge of the rail 83 (side edges of both the rail 82 and 83 toward the disk center in operation). In this embodiment, also, a part of the outer side edge of the rail 82 near the second narrow portion 82e is depressed and the width of the rail 83 near the trailing edge is narrowed in comparison with that in the embodiment of FIG. 1.

A n other structures, functions and advantages therefrom are the same as these of the embodiment shown in FIG. 1.

Figure 9:
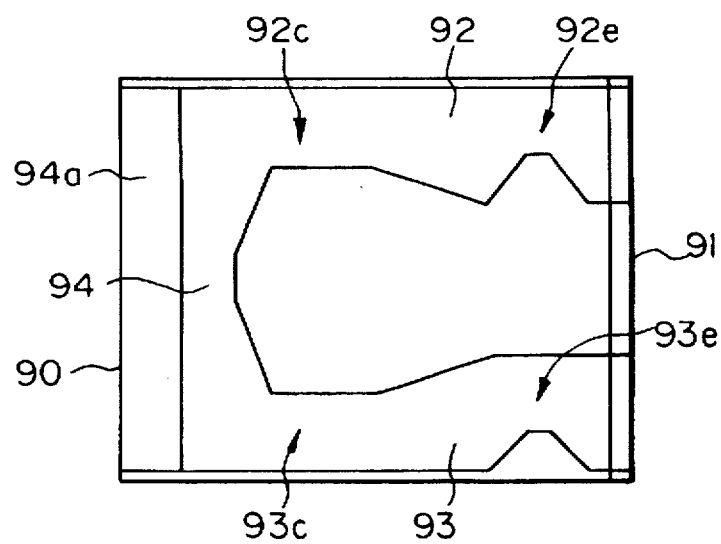
FIG. 9 is a bottom view showing an air bearing surface constitution of a further embodiment of a flying magnetic head slider according to the present invention.

FIG. 9 shows an ABS configuration of a further embodiment of a flying magnetic head slider according to the present invention.

In the figure, reference numeral 90 denotes a leading edge (air-intake side edge) of the flying head slider, 91 denotes a trailing edge (air-outlet side edge) of the slider, 92 and 93 denote two rails extending along side edges of the slider from the leading edge 90 to the trailing edge 91, and 94 denotes a cross rail located at the leading edge of the rails 92 and 93 to connect them together, respectively. Also, reference numeral 92a and 93a denote tapered portions formed near the leading edge 90 of the cross rail 94, 92c and 93c denote first narrow portions of the rails 92 and 93, and 92e and 93e denote second narrow portions of the rails 92 and 93, respectively.

As well as th e first narrow portions 12c and 13c in the embodiment of FIG. 1, the first narrow portions 92c and 93c in this embodiment are formed by depressing the inner side edges of the rails 92 and 93. The second narrow portions 92e and 93e are formed by depressing the inner side edge of the rail 92 and the outer side edge of the rail 93 (side edges of both the rails 92 and 93 toward the disk center in operation). In this embodiment, a first negative-pressure production area is effectively formed by the first narrow portions 92a and 93a and by the cross rail 94. This first negative-pressure production area and a second negative-pressure production area formed by the second narrow portions 92e and 93e can provide more stable flying attitude.

Another structures, functions and advantages therefrom are the same as these of the embodiment shown in FIG. 1.

Figure 10:
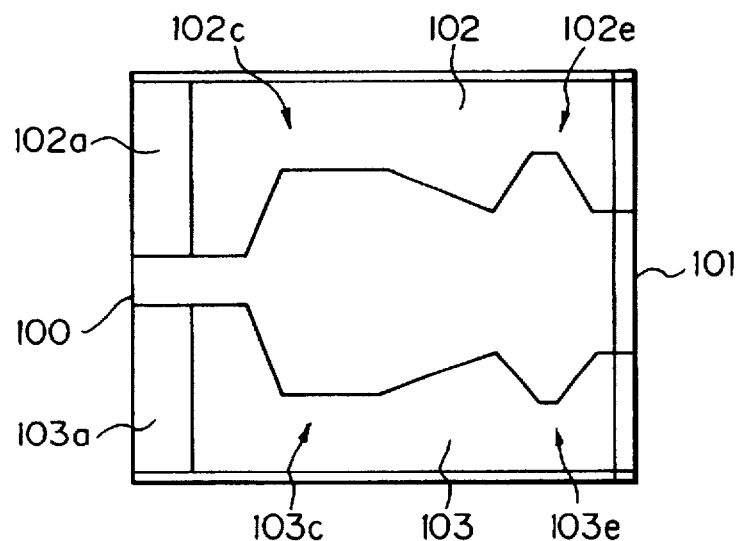
FIG. 10 is a bottom view showing an air bearing surface constitution of a still further embodiment of a flying magnetic head slider according to the present invention.

FIG. 10 shows an ABS configuration of a still further embodiment of a flying magnetic head slider according to the present invention.

In the figure, reference numeral 100 denotes a leading edge (air-intake side edge) of the flying head slider, 101 denotes a trailing edge (air-outlet side edge) of the slider, and 102 and 103 denote two rails extending along side edges of the slider from the leading edge 100 to the trailing edge 101, respectively. Also, reference numeral 102a and 103a denote tapered portions formed near the leading edge 100 of the rails 102 and 103, 102c and 103c denote first narrow portions of the rails 102 and 103, and 102e and 103e denote second narrow portions of the rails 102 and 103, respectively.

As well as the first narrow portions 12c and 13c in the embodiment of FIG. 1, the first narrow portions 102c and 103c in this embodiment are formed by depressing the inner side edges of the rails 102 and 103. The second narrow portions 102e and 103e are formed by depressing the inner side edges of the rails 102 and 103 (the side edge of the rail 102 toward the disk center in operation and the opposite side edge of the rail 103).

Another structures, functions and advantages therefrom are the same as these of the embodiment shown in FIG. 1.

Figure 11:
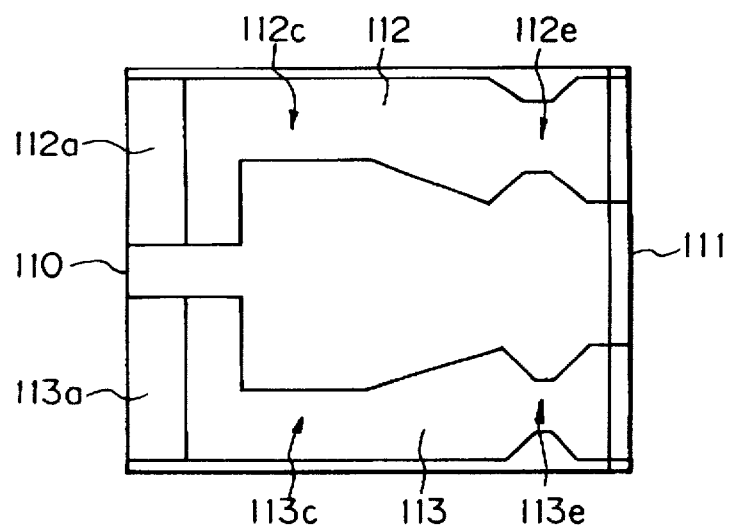
FIG. 11 is a bottom view showing an air bearing surface constitution of an another embodiment of a flying magnetic head slider according to the present invention.

FIG. 11 shows an ABS configuration of an another embodiment of a flying magnetic head slider according to the present invention.

In the figure, reference numeral 110 denotes a leading edge (air-intake side edge) of the flying head slider, 111 denotes a trailing edge (air-outlet side edge) of the slider, and 112 and 113 denote two rails extending along side edges of the slider from the leading edge 110 to the trailing edge 111, respectively. Also, reference numeral 112a and 113a denote tapered portions formed near the leading edge 110 of the rails 112 and 113, 112c and 113c denote first narrow portions of the rails 112 and 113, and 112e and 113e denote second narrow portions of the rails 112 and 113, respectively.

As well as the first narrow portions 12c and 13c in the embodiment of FIG. 1, the first narrow portions 112c and 113c in this embodiment are formed by depressing the inner side edges of the rails 112 and 113. The second narrow portions 112e and 113e are formed by depressing the inner side edges of the rails 112 and 113 and the outer side edges of the rails 112 and 113 (both the side edges of the rail 112 and both the side edges of the rail 113).

Another structures, functions and advantages therefrom are the same as these of the embodiment shown in FIG. 1.

Many widely different embodiments of the present invention may be constructed without departing from the spirit and scope of the present invention. It should be understood that the present invention is not limited to the specific embodiments described in the specification, except as defined in the appended claims.

What is claimed is:

1. A flying magnetic head slider with leading and trailing edges and side edges, said slider being opposed to a surface of a disk rotating around its center in operation, said slider including first and second rails being positioned adjacent said side edges and extending along said side edges from said leading edge to said trailing edge, each of said first and second rails comprising:

a first narrow portion with a narrower rail width, located at a position near said leading edge;

at least one second narrow portion with a partially narrower rail width, located at a position apart from said leading edge by a distance with a ratio of 0.6 to 0.9 to a whole longitudinal length of said slider; and a widening portion located between said at least one second narrow portion and said trailing edge, said widening portion partially having a rail width increasing from the narrower rail width of said second narrow portion, wherein each of said first and second rails has both inner and outer side edges, and wherein said at least one second narrow portion of the first rail is constituted by depressing only the inner side edge of the first rail and said at least one second narrow portion of said second rail is constituted by depressing only the outer side edge of the second rail, said inner side edge of the first rail and said outer side edge of the second rail being directed toward the center of the disk in operation; and wherein said inner side edge of the first rail and said inner side edge of the second rail face each other.

2. The slider as claimed in claim 1, wherein one of said first and second rails includes only one of said second narrow portion.

3. The slider as claimed in claim 1, wherein one of said first and second rails includes a plurality of said second narrow portions.

4. The slider as claimed in claim 1, wherein said first and second rails are connected by a cross rail formed near said leading edge on the slider.

* * * * *